(12) United States Patent
Matsushima et al.

(10) Patent No.: US 9,393,932 B2
(45) Date of Patent: Jul. 19, 2016

(54) STEERING LOCK APPARATUS

(71) Applicant: NSK LTD., Tokyo (JP)

(72) Inventors: Tooru Matsushima, Gunma (JP); Tooru Kamei, Gunma (JP); Tadashi Hibino, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/407,710

(22) PCT Filed: Apr. 18, 2013

(86) PCT No.: PCT/JP2013/061545
§ 371 (c)(1),
(2) Date: Dec. 12, 2014

(87) PCT Pub. No.: WO2013/187124
PCT Pub. Date: Dec. 19, 2013

(65) Prior Publication Data
US 2015/0114054 A1  Apr. 30, 2015

(30) Foreign Application Priority Data

Jun. 13, 2012 (JP) ................................ 2012-133468

(51) Int. Cl.
*B60R 25/02* (2013.01)
*B60R 25/021* (2013.01)
*B60R 25/0215* (2013.01)

(52) U.S. Cl.
CPC ....... *B60R 25/02105* (2013.01); *B60R 25/0211* (2013.01); *B60R 25/0215* (2013.01); *Y10T 70/5956* (2015.04)

(58) Field of Classification Search
CPC ............. Y10T 70/5646; Y10T 70/565; Y10T 70/5659; Y10T 70/5664; Y10T 70/5956; B60R 25/02; B60R 25/02105; B60R 25/0211; B60R 25/02115
USPC ........................................... 70/182–186, 252
See application file for complete search history.

(56) References Cited

U.S. PATENT DOCUMENTS

| | | | | |
|---|---|---|---|---|
| 5,974,841 A * | 11/1999 | Naganuma | ...................... | 70/186 |
| 6,076,382 A * | 6/2000 | Naganuma | ...................... | 70/186 |
| 6,324,878 B1 * | 12/2001 | Ramamurthy et al. | ......... | 70/186 |
| 7,251,968 B2 * | 8/2007 | Hasegawa | ...................... | 70/186 |

(Continued)

FOREIGN PATENT DOCUMENTS

| | | |
|---|---|---|
| EP | 1992544 | 11/2008 |
| JP | 2004-98788 | 4/2004 |

(Continued)

*Primary Examiner* — Christopher Boswell
(74) *Attorney, Agent, or Firm* — Hartman Global IP Law; Gary M. Hartman; Domenica N. S. Hartman

(57) ABSTRACT

A steering lock apparatus is provided that can protect a steering column 2e from damage, such as cracking, even when a steering wheel is forcibly rotated with the ignition key off. Protrusions 24 in the circumferential direction are provided at a plurality of locations in the axial direction of peripheral edge portions on both sides in the circumferential direction, which is a rotational direction of the steering wheel, of a peripheral edge of a lock through hole 16d. The protrusions 24 in the circumferential direction absorb the large force, that is applied to the peripheral edge portions of the lock through hole 16d in an attempt to rotate the steering wheel with the ignition key off by plastically deforming.

7 Claims, 8 Drawing Sheets

(56) References Cited

U.S. PATENT DOCUMENTS

| | | | |
|---|---|---|---|
| 7,412,858 B2* | 8/2008 | Tsukano | B60R 25/02153 70/186 |
| 7,669,444 B2* | 3/2010 | Fernandez et al. | 70/185 |
| 7,681,423 B2* | 3/2010 | Cymbal et al. | 70/186 |
| 7,703,309 B2* | 4/2010 | Okuno et al. | 70/186 |
| 9,108,585 B2* | 8/2015 | Town et al. | |
| 2006/0000661 A1 | 1/2006 | Daniel et al. | |

FOREIGN PATENT DOCUMENTS

| | | |
|---|---|---|
| JP | 2004-237973 | 8/2004 |
| JP | 2006-36106 | 2/2006 |
| JP | 2006-36107 | 2/2006 |
| JP | 2009-190680 | 8/2009 |
| JP | 2012-30622 | 2/2012 |
| WO | 2009063908 | 5/2009 |

* cited by examiner

STEERING LOCK APPARATUS

CROSS REFERENCE TO RELATED APPLICATIONS

This application claims the benefit of International Application No. PCT/JP2013/061545 filed Apr. 18, 2013, having a claim of priority to JP patent application number 2012-133468, filed Jun. 13, 2012.

TECHNICAL FIELD

The present invention relates to a steering lock apparatus for preventing theft of an automobile by making it impossible to operate a steering wheel of the automobile.

BACKGROUND ART

FIG. 4 illustrates an example of conventionally known construction of a steering apparatus for applying a steering angle to steered wheels (front wheels). In this steering apparatus, a cylindrical steering column 2 is supported by a vehicle body 1, and a steering shaft 3 is supported radially inside of the steering column 2 so as to be able to rotate freely. The steering shaft 3 protrudes toward the rear from the opening on the rear end of the steering column 2, and a steering wheel 4 is fastened to the rear-end portion. When the steering wheel 4 is rotated, the rotation is transmitted to an input shaft 8 of a steering-gear unit 7 by way of the steering shaft 3, a universal joint 5a, an intermediate shaft 6, and a universal joint 5b. As the input shaft 8 rotates, a pair of tie rods 9 that are located on both sides of the steering-gear unit 7 are pushed and pulled, and a steering angle is applied to a pair of left and right steered wheels according to the amount that the steering wheel 4 is operated. In the case of the steering apparatus illustrated in FIG. 4 an expandable steering column and steering shaft are employed in order that the forward-backward position of the steering wheel 4 can be adjusted. Of an outer column and inner column of the expandable steering column 2, at least the outer column is formed using a light metal alloy such as an aluminum alloy or thin carbon steel for machine structural use in order to lighten the weight thereof.

In recent years, automobiles have been equipped with various kinds of anti-theft apparatuses as a method for preventing theft of automobiles. One kind of such an anti-theft apparatus is a steering lock apparatus that makes it impossible to operate the steering wheel unless a proper key is used. The construction of such a steering lock apparatus has been disclosed in JP 2004-098788 (A), JP 2004-237973 (A), JP 2006-036106 (A), and JP 2006-036107 (A). FIG. 5 and FIG. 6 illustrate a first example of conventional construction as disclosed in JP 2006-036106 (A).

In this first example of conventional construction, a lock housing 10 that constitute the steering lock apparatus is joined and fastened to part of the steering column 2a by way of a clamp fixture 11 and a pair of bolts 12. The lock housing 10 has a cylindrical housing portion 13, a bottom plate portion 14 that is provided in a state that covers the opening on the base end of the housing portion 13, and a pair of installation flange portions 15 that are provided in a state so as to protrude from the outer-circumferential surface on the base-end portion of the housing portion 13. A through hole (not illustrated) is provided in part of the bottom plate portion 14 of the lock housing 10, and a lock through hole 16 is provided in a portion of part of the steering column 2a that is aligned with the through hole; and these holes pass through from the inside of the lock housing 10 and the radially inside of the steering column 2a. Moreover, in a portion of part of the steering shaft 3a that coincides in the axial direction with the through hole in the bottom plate portion 14 and the lock through hole 16, a plurality of engaging concave portions 17 are provided at a plurality of locations in the circumferential direction thereof, such that the portion has a male spline shape with coarse pitch. Furthermore, a lock unit 18 is fastened to the inside of the lock housing 10, and a guide portion 19 that is provided on the tip-end portion of the lock unit 18 fits inside the lock through hole 16. The lock unit 18 has a lock pin 21 that is moved forward or backward in the radial direction of the steering column 2a by an electric actuator 20.

In this kind of steering lock apparatus, the actuator 20 causes the lock pin 21 to move forward toward the radially inside of the steering column 2a when the ignition key is turned off. An elastic force inward in the radial direction is applied to the lock pin 21 by an elastic member such as a compression coil spring or the like. Therefore, in a state that the lock through hole 16 is aligned with one of the engaging concave portions 17, the tip-end portion of the lock pin 21 engages with the engaging concave portion 17, which prevents rotation of the steering shaft 3a. On the other hand, in a state in which the lock though hole 16 is not aligned with an engaging concave portion 17, the tip-end surface of the lock pin 21 comes in elastic contact with a portion on the outer-circumferential surface of the steering shaft 3a that is between a pair of engaging concave portions 17 that are adjacent in the circumferential direction. As the steering shaft 3a is rotated from this state, the tip-end portion of the lock pin 21 engages with one of the engaging concave portions 17, and prevents rotation of the steering shaft 3a.

However, in this kind of steering lock apparatus, when a steering wheel 4 (see FIG. 4) is forcibly rotated with the ignition key off, a large force is applied to the engagement portion between the engaging concave portion 17 of the steering shaft 3a and the lock pin 21, and there is a possibility that the steering shaft 3a will be broken.

In a second example of conventional construction illustrated in FIG. 7, instead of forming engaging concave portions around the steering shaft, a key-lock collar 22, having engaging concave portions 17a formed at plural locations around the outer-circumferential surface thereof, is fastened around the middle portion in the axial direction of the steering shaft 3b with enough strength to be able to at least practically prevent a steering angle from being applied to the steered wheels even if the steering shaft 3b is rotated in a state that the ignition key is turned off and the lock pin is engaged with one of the engaging concave portions 17a. In other words, in a state that the ignition key is turned off, the steering shaft 3b will not rotate by an operating force for operating the steering wheel 4 in a normal driving position, however, when the steering wheel 4 is rotated by a force that exceeds a value that is regulated by the key-lock regulation, the steering shaft 3b will rotate with respect to the key-lock collar 22.

In the steering lock apparatus of the second example of conventional construction, even when the steering wheel 4 is forcibly rotated with the ignition key off, the key-lock collar 22 and the steering shaft 3b will not be broken. However, when an attempt is made to forcibly rotate the steering wheel 4 in a state that an engaging concave portion 17a of the key-lock collar 22 and the lock pin 21 are engaged, a large force will be applied from the lock pin 21 to the outer-peripheral edge portion of the lock through hole 16 by way of the guide portion 19 due to a static friction force that is larger than the dynamic friction force, before the steering shaft 3b starts to rotate with respect to the key-lock collar 22. The steering column 2a is made using a material having a low rigidity such as a light metal alloy, so when a large force is applied to the outer-peripheral edge portion of the lock through hole 16, there is a possibility that damage such as cracking will occur in the steering column 2a. Normally, the shape of the lock through hole 16 is a rectangular shape such as illustrated in FIG. 8A, however, in that case, stress is concentrated at the four corners of the outer-peripheral edge portion of the lock through hole 16.

On the other hand, as illustrated in FIG. 8B, construction is proposed in which this kind of stress concentration is reduced by using a Venturi tube shaped lock through hole 16a of which the middle portions of the peripheral edge portions on both sides in the axial direction protrude. However, stress concentration in the circumferential direction of the portions where the corners of the guide portion 19 come in contact as indicated by α in FIG. 8B cannot be avoided. Furthermore, as illustrated in FIG. 8C, in JP 2006-036106 (A) and JP 2006-036107 (A), an oval shaped lock through hole 16b is employed, and in this case, the stress on the peripheral edge portion of the lock through hole is dispersed. However, it is also necessary that the shape of the guide portion 19 of the lock unit 18 be an oval shape, and there is a possibility that installation space will not be able to be ensured, and that the manufacturing cost of the lock unit 18 will increase.

FIG. 9 illustrates another example of a shape of a lock through hole of a steering lock apparatus that is disclosed in JP 2009-190680 (A). In this example, a pair of curved convex portions 23 are provided on the peripheral edge portion on both sides in the circumferential direction of the lock through hole 16c such that the width in the circumferential direction of the lock through hole 16c is the smallest in the middle portion in the axial direction, and becomes larger going in the forward-backward direction. In this case, even when an attempt is made to forcibly rotate the steering wheel 4 with the ignition key off, the tip-end edges of the convex portions 23 where a force is applied from the lock pin 21 by way of the guide portion 19 are curved, so it is possible to disperse that force. However, the steering shaft 3b (see FIG. 7) is such that both the front and rear end portions are supported by both the front and rear end portions of the steering column 2a by way of bearings, and the span of these bearings is long. Therefore, when an attempt is made to forcibly rotate the steering wheel 4 with the ignition key off, it becomes easy for the steering shaft 3b to rotate while bending. In this case, because the tip-end edges of the convex portions 23 are curved, it becomes easy for the guide portion 19 to tilt in the axial direction. When the guide portion 19 is pressed strongly against the peripheral edge portion in the circumferential direction of the lock through hole 16c with the guide portion 19 in a tilted state, there is a possibility that stress that is caused by forces that are applied to the peripheral edge portions of the lock through hole 16c will become concentrated in part of the peripheral edge portion.

RELATED LITERATURE

Patent Literature

[Patent Literature 1] JP 2004-098788 (A)
[Patent Literature 2] JP 2004-237973 (A)
[Patent Literature 3] JP 2006-036106 (A)
[Patent Literature 4] JP 2006-036107 (A)
[Patent Literature 3] JP 2009-190680 (A)

SUMMARY OF INVENTION

Problem to be Solved by Invention

Taking the above situation into consideration, the object of the present invention is to achieve construction of a steering lock apparatus for preventing theft of an automobile by making it impossible to operate the steering wheel of the automobile and that, when an attempt is made to forcibly rotate the steering wheel with the ignition key off, is capable of preventing the occurrence of damage such as cracking of the steering column.

Means for Solving Problems

The steering lock apparatus of the present invention has: a steering column, a key-lock collar, a lock through hole, and a lock unit. The steering column has a cylindrical shape and is supported by the vehicle body. The key-lock collar is supported by part of a steering shaft that is supported on the radially inside of the steering column so as to be able to rotate freely, and has an engaging concave portion provided in at least one location in the circumferential direction thereof. The steering shaft protrudes toward the rear from the steering column, and the steering wheel is fastened to the rear-end portion thereof.

The lock through hole is formed in a portion on the outer circumferential surface of the steering column, the phase of the portion in the axial direction being aligned with the key-lock collar, and protrusions are provided at a plurality of locations that are separated in the axial direction of the peripheral edge portions on both sides in the circumferential direction of the peripheral edge of the lock through hole.

The lock unit is supported by the steering column with part located inside the lock through hole and having a lock pin that, with the ignition key turned off, substantially prevents rotation of the steering shaft on the inside of the steering column by displacing inward in the radial direction causing the tip-end portion thereof to engage with the engaging concave portion.

It is preferable that the protrusions in the circumferential direction have tip-end edges having a straight shape that are parallel in the axial direction of the steering column. In this case, it is preferable that all of the tip-end edges of the protrusions in the circumferential direction that are formed on the peripheral edge portion on the same side in the circumferential direction are located on the same virtual straight line. Moreover, it is preferable that the edges on both ends in the axial direction of the tip-end edges and the peripheral edge portions are continuous by way of arc portions.

Furthermore, it is preferable that the steering column has a pair of column-side flanges that are formed in portions of the steering column, the phase of the portions in the axial direction of the steering column being aligned with the lock through hole, and that protrude outward from both side in the width direction of the steering column; the lock unit is supported by the steering column by bolts that are inserted through these through holes; and when the size of the gaps in the rotational direction of the steering wheel between the inner circumferential edges of the through holes and the outer circumferential surfaces of the bolts is taken to be δ, the size of the gaps between the tip-end edges of the protrusions in the circumferential direction and the side surfaces in the width direction (side surfaces that face in the width direction of the steering column) of the part of the lock unit that is located inside the lock through hole is taken to be d, and the height of each of the protrusions in the circumferential direction is taken to be h, the relationship $d<\delta \leq d+h$ is satisfied.

In other words, a feature of the steering lock apparatus of the present invention is that protrusions in the circumferential direction are provided at a plurality of locations separated in the axial direction of peripheral edge portions on both sides in the circumferential direction of the lock through hole that come in contact with the side surfaces in the width direction of the lock unit, the protrusions plastically deforming and absorbing a large force that is applied in an attempt to rotate the steering wheel with the ignition key turned off.

Effect of Invention

With the steering lock apparatus of the present invention, the occurrence of damage such as cracking of the steering column is prevented even when there is an attempt to forcibly rotate the steering wheel with the ignition key off. In other words, the large force that is applied in an attempt to rotate the steering wheel is applied from the key-lock pin to the tip-end edges of protrusions in the circumferential direction that are provided on the peripheral edge portions of the lock through hole, and this force is absorbed by these protrusions plastically deforming due to the force, which prevents stress concentration in the peripheral edge portions of the lock through hole.

Even when a large force applied in an attempt to rotate the steering wheel is applied in the torsion direction of the steering column, since the protrusions in the circumferential direction are provided at a plurality of locations that are separated in the axial direction of the peripheral edge portions on both sides in the circumferential direction of the peripheral edge of the long through hole, the protrusions in the circumferential direction can plastically deform according to the size of the applied force and absorb this force, so stress concentration in part of the peripheral edge portions is prevented.

Moreover, in a preferred embodiment of the present invention, a large force that is applied in an attempt to rotate the steering wheel can cause the inner circumferential edges of though holes that are formed in column-side flange portions that are provided on the steering column to come in contact with the outer circumferential surfaces of the rod portions of bolts that are inserted through the through holes before the protrusions in the circumferential direction are completely deformed. Therefore, the large force is supported by the engagement between the through holes and the bolts in addition to the engagement between the key-lock pin and the engaging concave portion and the engagement between the lock through hole and the lock unit.

MODES FOR CARRYING OUT INVENTION

FIRST EXAMPLE

Figure 1:
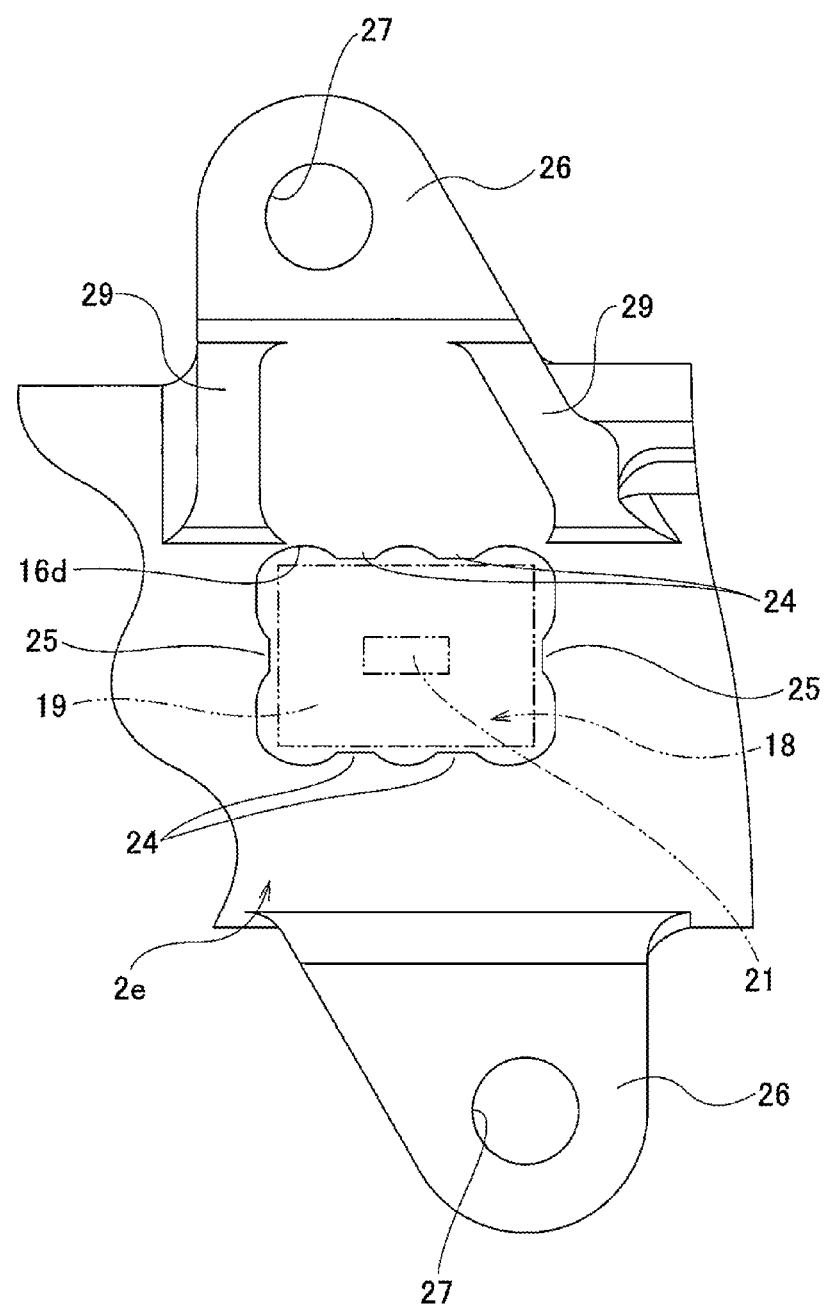
FIG. 1 is a top view of major portions of a first example of an embodiment of the present invention.
Figure 4:
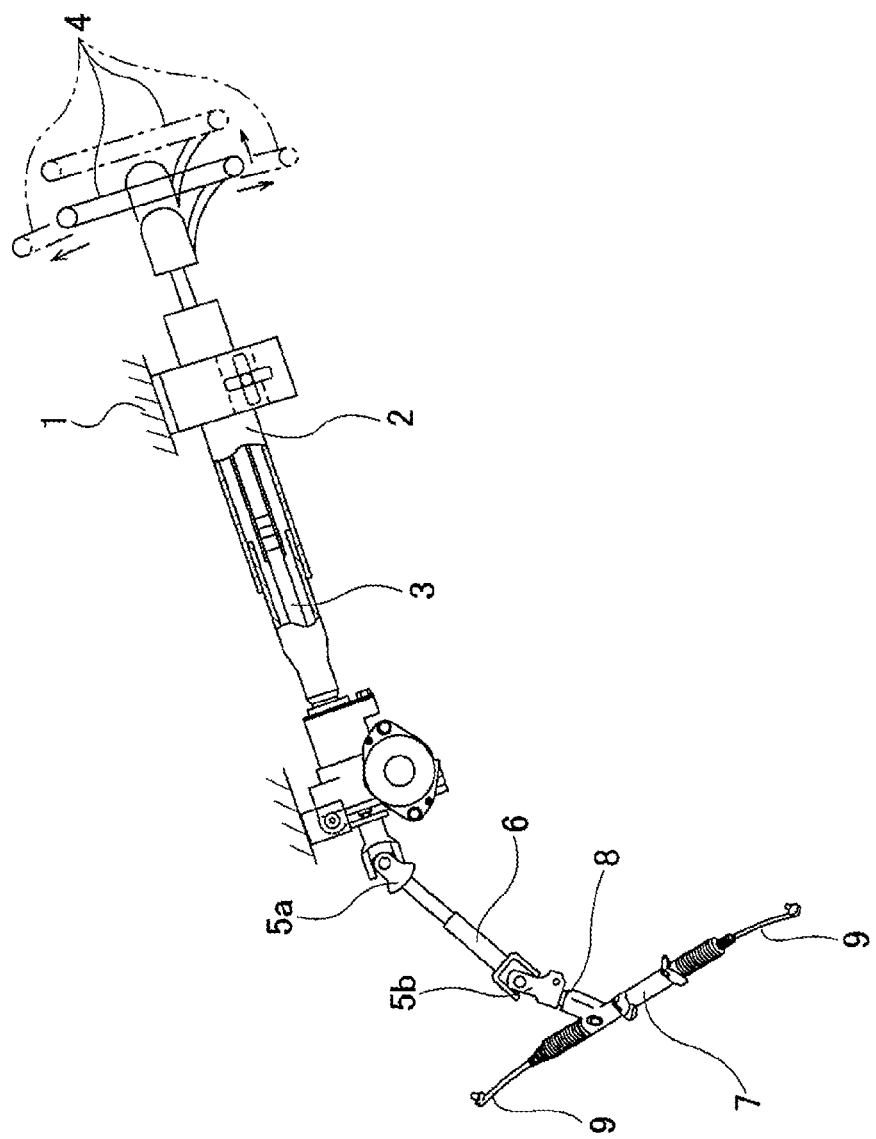
FIG. 4 is a partial cross-sectional side view of an example of a conventionally known steering apparatus.
Figure 7:
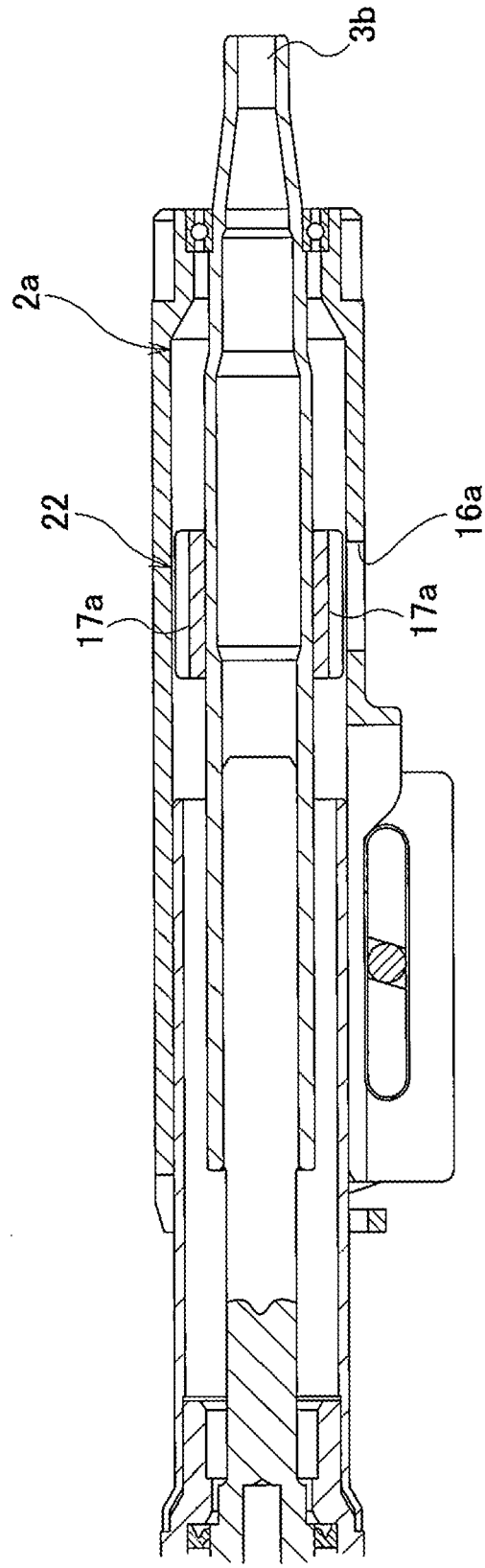
FIG. 7 is a cross-sectional view illustrating a second example of conventional construction of a steering lock apparatus.
Figure 8:
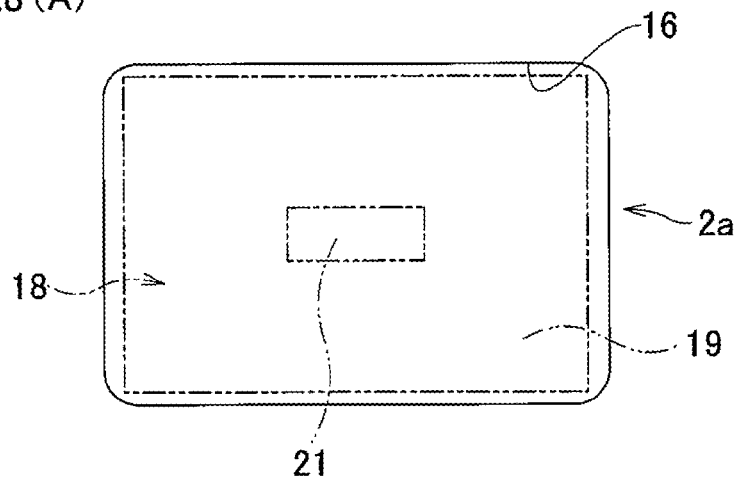
FIGS. 8A to 8C are views illustrating three examples of shapes of a lock through hole of a conventional steering lock apparatus.
Figure 8:
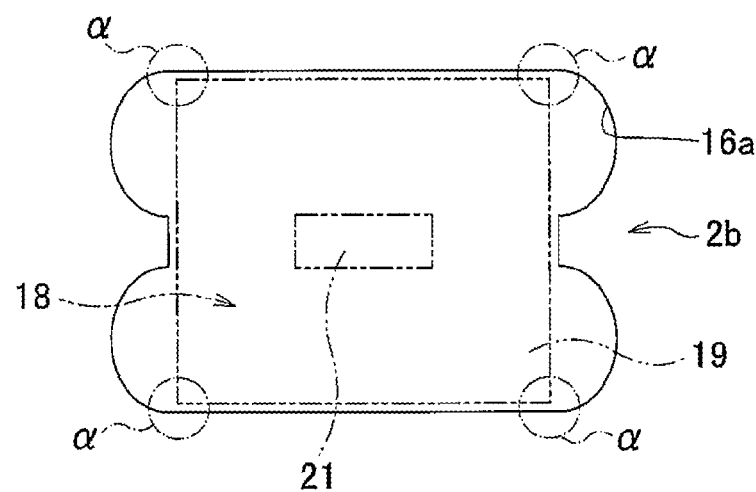
Figure 8:
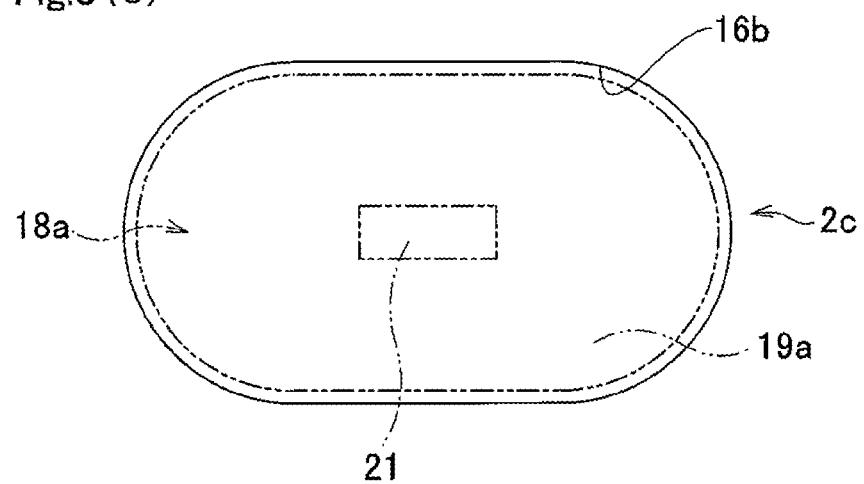
Figure 9:
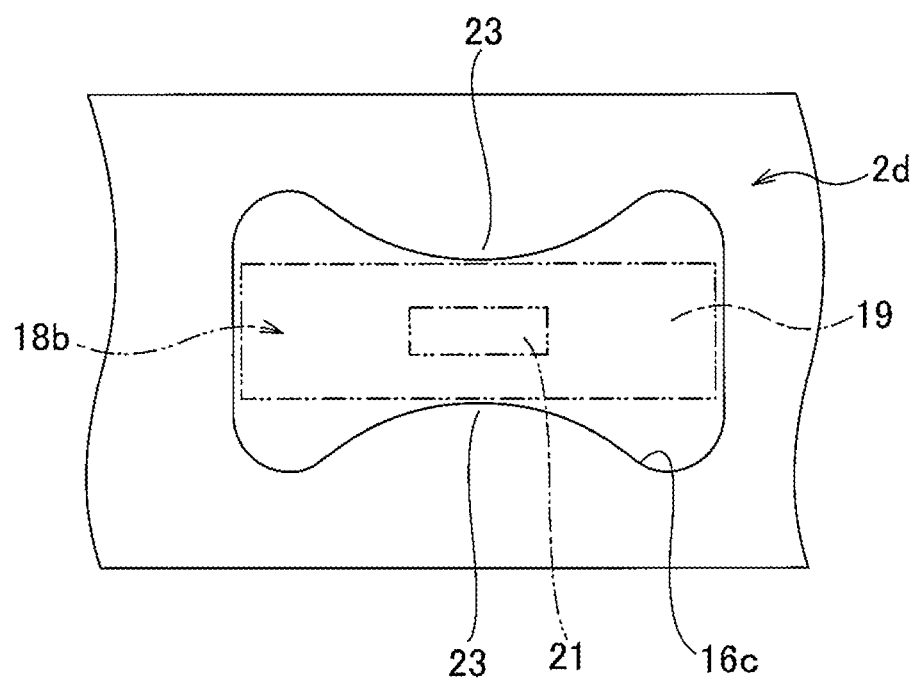
FIG. 9 is a view illustrating another example of the shape of a lock through hole.

FIG. 1 illustrates a first example of an embodiment of the present invention. The steering lock apparatus of this example has a steering column 2e having a cylindrical shape, a key-lock collar 22 (see FIG. 7) that is supported by part of a steering shaft 3b (see FIG. 7) that is supported on the inside of the steering column 3e and that is provided with engaging concave portions 17a (see FIG. 7) in at least one location (a plurality of locations in this example) in the circumferential direction thereof, a lock through hole 16d that is formed in a position on the outer-circumferential surface of the steering column 2e, the phase of the portion in the axial direction being aligned with the key-lock collar 22, and a lock unit 18 (see FIG. 5) that is supported by the steering column 2e with part located in the portion inside the lock through hole 16d and that has a lock pin 21, the tip-end portion of which is able to engage with an engaging concave portion 17a. When the ignition key is turned off, the lock pin 21 displaces inward in the radial direction and the tip-end portion thereof engages with an engaging concave portion 17a, which substantially prevents the steering wheel 3b from rotating. A feature of the steering lock apparatus of the present invention, including this example, is construction that, even when an attempt is made to rotate the steering wheel 4 (see FIG. 4) that is fastened to the steering shaft 3b with a large force with the ignition key turned off, is able to prevent the occurrence of damage such as cracking to the steering column 2e. The construction and functions of the other parts are the same as in the conventionally known steering lock apparatus, including the construction illustrated in FIG. 7.

In this example, protrusions 24 that protrude in the circumferential direction are provided at a plurality of locations (two locations in the illustrated example) that are separated in the axial direction of the peripheral edge portions of both sides in the circumferential direction (up-down direction in FIG. 1) on the peripheral edge of the lock through hole 16d. The tip-end edges of the protrusions 24 in the circumferential direction are straight and parallel in the axial direction of the steering column 2e (side surfaces in the width direction of the lock unit 18). Moreover, of these protrusions 24 in the circumferential direction, the direction of virtual straight lines that connect the tip-end edges of the protrusions 24 in the circumferential direction that are formed on the same side in the circumferential direction are parallel in the axial direction of the steering column 2b. In other words, all of the tip-end edges of the protrusions 24 in the circumferential direction that are formed on the peripheral edge portion on the same side in the circumferential direction are located on the same virtual straight line. The edges of both ends in the axial direction of the tip-end edges of the protrusions 24 in the circumferential direction and the peripheral edge portions of the lock through hole 16d are smoothly continuous by arc portions. The shape, size, location and number of such protrusions 24 in the circumferential direction are set by design according to the magnitude of the force that is supposed to be absorbed by plastic deformation such as buckling deformation of the protrusions 24 in the circumferential direction.

It is preferable that the width in the circumferential direction of these protrusions 24 in the circumferential direction is 1.05 to 1.2 times, and more preferably, 1.13 to 1.16 times the maximum width in the circumferential direction of the lock through hole 16d. Moreover, the width in the axial direction of the tip-end edges of these protrusions 24 in the circumferential direction is preferably 1.05 to 1.2 times, and more preferably, 1.13 to 1.16 times the maximum width in the axial direction of the lock through hole 16d. Furthermore, in the case where there are two protrusions 24 in the circumferential direction provided on each side in the circumferential direction, the space between the center portions in the axial direction of the protrusions 24 in the circumferential direction that are formed on the peripheral edge portion on the same side in the circumferential direction is preferably 3 mm to 14 mm, and more preferably, 5 mm to 7 mm. It is preferable that, as in this example, the tip-end edges of each of the protrusions 24 in the circumferential direction are straight, and the tip-end edges of protrusions 24 in the circumferential direction that are formed on the peripheral edge portion on the same side in the circumferential direction are located on the same virtual straight line, however, when, for example, three or more protrusions 24 in the circumferential direction are provided on each side in the circumferential direction, the shape is not limited to this, and, for example, it is possible for the tip-end edges to be a curved arc shape, or the positions of the tip-end edges could be offset in the circumferential direction so as not to be on the same virtual straight line. Furthermore, it is also possible for the shape of these protrusions 24 in the circumferential direction to be some other shape such as a trapezoid.

In this example, one protrusion 25 in the axial direction is provided on the peripheral edge portions on both sides in the axial direction (left-right direction in FIG. 1) of the peripheral edge of the lock through hole 16d. By providing protrusions 25 in the axial direction, the gaps in the areas of fit between the lock through hole 16d and the lock unit 18 becomes small, and looseness in the areas of fit is suppressed; also, the radius of curvature of the corner portions of the lock through hole 16d becomes large, which prevents stress concentration in the corner portions. The shape of the protrusions 25 in the axial direction is preferably the same as the shape of the protrusions 24 in the circumferential direction, however, the shape, size, position and number of protrusions 25 in the axial direction can also be set by design according to the relationship with functions such as described above.

A guide portion 19 of the lock unit 18 that is supported by and fastened to a lock housing 10 (see FIG. 5) of the lock unit 18 is fitted inside the lock through hole 16d. A pair of column-side flange portions 26 are provided in portions in the axial direction of the steering column 2e that are aligned with the lock through hole 16d so as to protrude out from both sides in the width direction of the steering column 2e. The column-side flange portions 26 are integrally formed when forming the steering column 2e, or, are provided on the steering column 2e after by fastening a separately formed metal member by welding, soldering, fastening with screws, fastening with rivets or the like. Moreover, a reinforcement rib 29 that spans between the outer-circumferential surface of the steering column 2e and the column-side flange portions 26 is provided, and this reinforcement rib 29 improves the moment rigidity of the column-side flange portions 26 in the circumferential direction of the steering column 2e. Bolts 12 that are inserted into through holes 27 that are formed in the column-side flange portions 26 screw into screw holes 28 (see FIG. 5) that are provided in installation flange portions 15 of the lock housing 10, and by further tightening the bolts 12, the lock housing 10 is supported by and fastened to the steering column 2e. The steering column 2e is formed by die cast formation of a light metal alloy such as aluminum alloy or magnesium alloy. However, it is possible to apply the present invention even in the case where the steering column 2e is formed using thin carbon steel for machine structural use.

With the steering lock apparatus of this example, the occurrence of damage such as cracking to the steering column 2e is prevented even when there is an attempt to rotate the steering wheel 4 with a large force with the ignition key turned off. In other words, when there is an attempt to forcibly rotate the steering wheel 4 with the ignition key off and there is engagement between the lock pin 21 and an engaging concave portion 17a of the key-lock collar 22, that force is applied to the tip-end edges of the protrusions 24 in the circumferential direction that are located in front in the rotational direction on the peripheral edge portions in the circumferential direction of the lock through hole 16d by way of the guide portion 19. Then, the protrusions 24 in the circumferential direction that are located in front in the rotational direction undergo plastic deformation, such as buckling deformation, which absorbs the large force that was used in the attempt to rotate the steering wheel 4. As a result, the occurrence of damage such as cracking to the steering column 2e before the steering shaft 3b rotates with respect to the key-lock collar 22 is prevented.

In this example, the protrusions 24 in the circumferential direction are provided at a plurality of locations on each of the peripheral edge portions in the circumferential direction of the lock through hole 16d, so it is possible to effectively disperse and absorb the large force that was applied in the attempt to rotate the steering wheel 4. In other words, when an attempt is made to rotate the steering wheel 4 with a large force with the ignition key turned off, there is a possibility that the steering shaft 3a will bend and that the force will be applied unevenly in the axial direction on the peripheral edge portions in the circumferential direction of the peripheral edge of the lock through hole 16d. In this example, the protrusions 24 in the circumferential direction are provided at a plurality of locations that are separated in the axial direction on the peripheral edge portions on both sides in the circumferential direction of the lock through hole 16d, so when the force that was applied in an attempt to rotate the steering wheel 4 is unevenly applied in the axial direction, the large force that is applied in the attempt to rotate the steering wheel is shared and supported by the plurality of protrusions 24 in the circumferential direction even though the amount of plastic deformation of the protrusions 24 in the circumferential direction differ according to the size of the force applied to the protrusions 24 in the circumferential direction. As a result, it is possible to disperse and absorb this force even when the force is unevenly applied to the edge portions on the circumferential sides of the lock through hole 16d. Furthermore, the peripheral edge portions of the lock through hole 16d are smoothly continuous by way of the arc portions, so it is possible to prevent a stress concentration in the base-end portion of the protrusions 24 in the circumferential direction. However, with three or more protrusions 24 in the circumferential direction provided on each side, it is possible to disperse the stress in the base-end portions of the protrusions 24 in the circumferential direction, and it is possible to employ other shapes.

SECOND EXAMPLE

Figure 2:
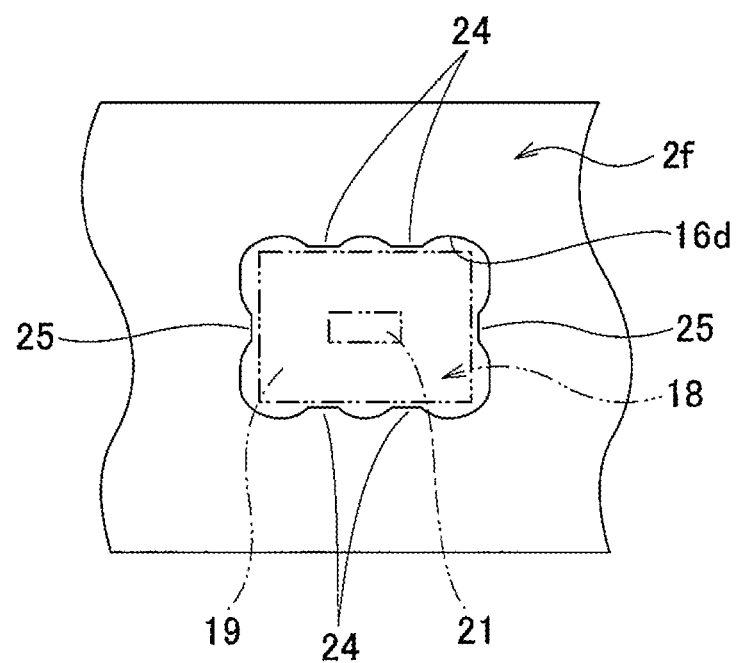
FIG. 2 is a top view of major portions of a second example of an embodiment of the present invention.

FIG. 2 illustrates a second example of an embodiment of the present invention. In this example, column-side flange portions 26 (see FIG. 1) are not provided in the middle portion in the axial direction of the steering column 2f. In other words, the steering column 2f is constructed using a simple pipe made of a light metal alloy such as aluminum alloy, or a steel pipe made of thin carbon steel for machine structural use. As in the case of the first example of conventional construction illustrated in FIG. 5, at a position in the axial direction in a portion of the steering column 2f that is aligned with the lock through hole 16d, the lock housing 10 is joined and fastened with a clamp fixture 11 and bolts 12. The construction and functions of other parts are the same as in the first example of an embodiment.

THIRD EXAMPLE

Figure 3:
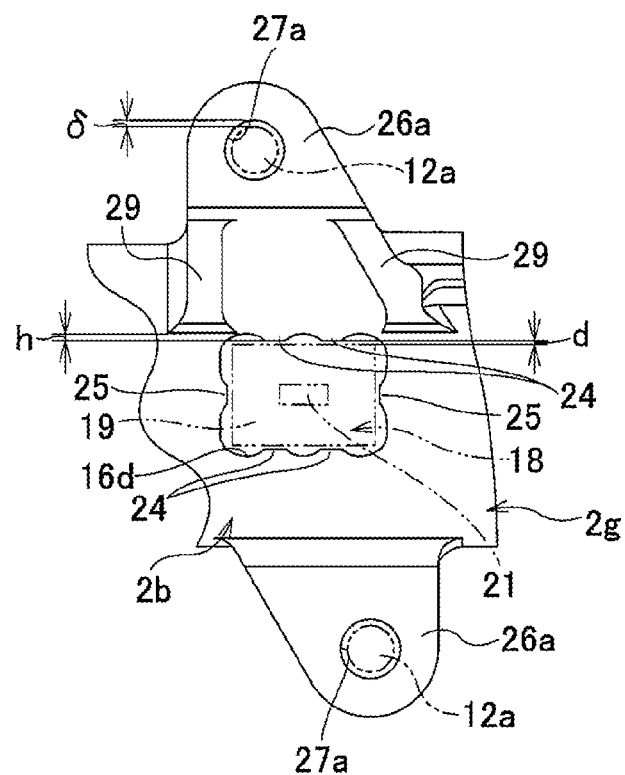
FIG. 3A is a top view of major portions of a third example of an embodiment of the present invention.
FIG. 3B is a top view of the third example illustrating a state in which a large force in the rotational direction is applied to the steering wheel.
Figure 3:
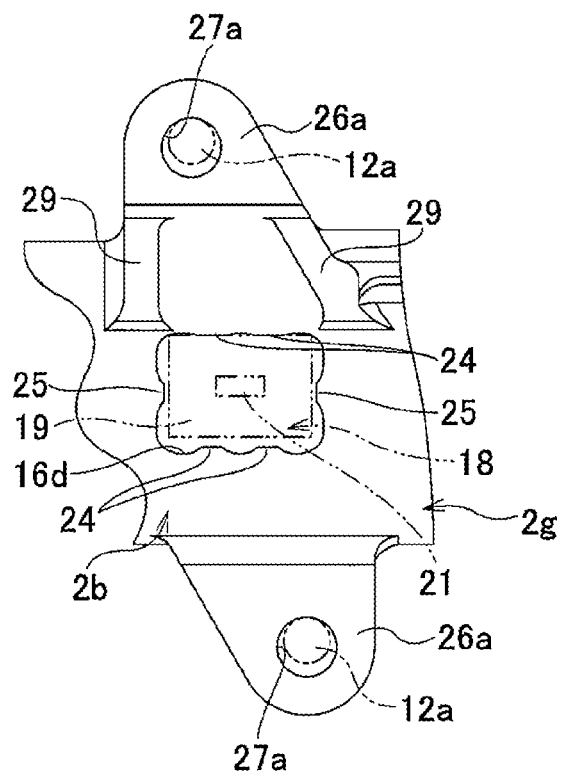

FIGS. 3a and 3B illustrate a third example of an embodiment of the present invention. In this example, as in the first example of an embodiment, in a portion of the steering column 2g at a location in the axial direction that is aligned with the lock through hole 16d, a pair of column-side flange portions 26a are provided so as to protrude from both sides in the width direction of the steering column 2g. The lock unit 18 is supported by and fastened to the steering column 2g by bolts 12a that are inserted through the through holes 27a of the column-side flange portions 26a.

In this example, the size of the gaps in the rotational direction (circumferential direction) of the steering wheel 4 (see FIG. 4) between the through holes 27a and bolts 12a, or in other words, the size δ of approximately half the size of the difference between the inner diameter of the through holes 27a and the outer diameter of the bolts 12a is regulated such that the relationship between the size of the gap between the tip-end edges of the protrusions 24 in the circumferential direction of the lock through hole 16b and the side surfaces in the width direction of the guide portion 19, or in other words, d, which is the size of approximately half the size of the difference between the dimension between the tip- end edges of the protrusions 24 in the circumferential direction that face each other in the circumferential direction and the width of the guide portion 19 (dimension in the up- down direction of the guide portion 19 in FIGS. 3A and 3B), and the height h in the circumferential direction of the protrusions 24 in the circumferential direction is within the range of d<δ≤d+h.

In this example, the gaps between the through holes 27a and bolts 12a, the gaps between the tip-end edges of the protrusions 24 in the circumferential direction and the side surfaces in the width direction of the guide portions 19, and the height in the circumferential direction of the protrusions 24 in the circumferential direction are regulated as described above, so when the large force that is applied in an attempt to rotate the steering wheel 4 is applied to the tip-end edges of the protrusions 24 in the circumferential direction, the inner-circumferential edges of the through holes 27a and the outer circumferential surfaces of the bolts 12a come in contact before the protrusions 24 in the circumferential direction plastically deform while absorbing this force. As a result, it is also possible to support the large force that is applied in the attempt to rotate the steering wheel 4 by the engagement between the through holes 27a and bolts 12a and not just by the engagement between the lock pin 21 and an engaging concave portion 17a (see FIG. 7), and the engagement between the lock through hole 16d and the guide portion 19. As a result, it is possible to more effectively prevent an occurrence of damage such as cracking to the steering column 2g by reducing the force that is applied per one engagement location between the lock through hole 16d and the guide portion 19.

Figure 5:
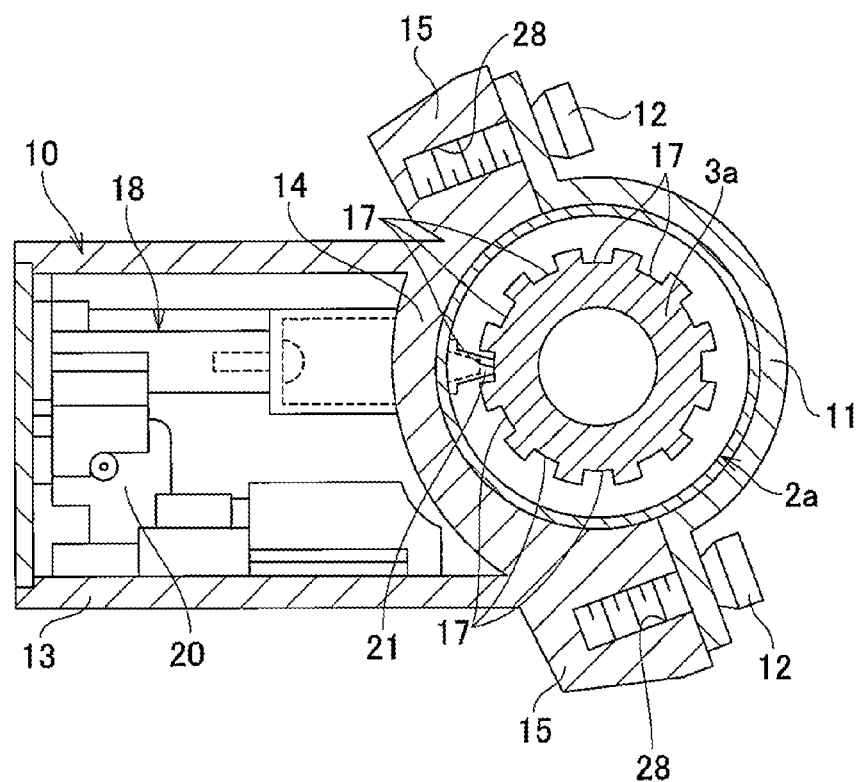
FIG. 5 is a cross-sectional view illustrating a first example of conventional construction of a steering lock apparatus.
Figure 6:
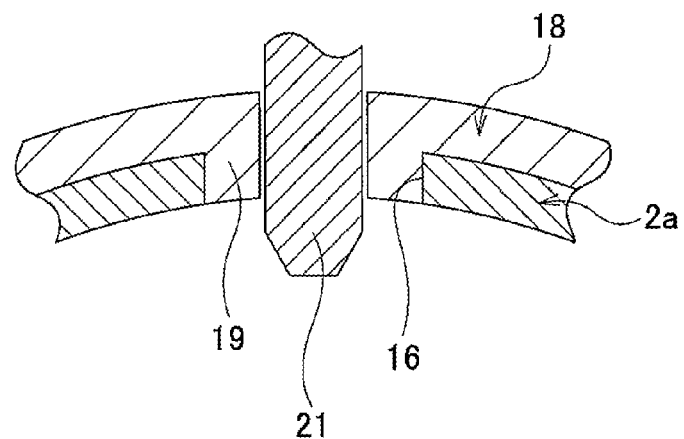
FIG. 6 is a cross-sectional view of major portions of a first example of conventional construction, and illustrates the state of an engagement portion between the steering column and the lock unit.

In the case where a clamp fixture 11 as illustrated in FIG. 5 is used instead of the column-side flange portions 26a as in the second example of an embodiment of the present invention, it is possible to regulate the relationship between the gaps between the through holes 27a and bolts 12a, the gaps between the tip-end edges of the protrusions 24 in the circumferential direction and the side surfaces in the width direction of the guide portion 19, and the height in the circumferential direction of the protrusions 24 in the circumferential direction of this example. The construction and functions of the other parts of this example are the same as in the first example of an embodiment.

EXPLANATION OF REFERENCE NUMBERS

1 Vehicle body
2, 2a to 2g Steering column
3, 3a, 3b Steering shaft
4 Steering wheel
5a, 5b Universal joint
6 Intermediate shaft
7 Steering gear unit
8 Input shaft
9 Tie rod
10 Lock housing
11 Clamp fixture
12, 12a Bolt
13 Housing portion
14 Bottom plate portion
15 Installation flange portion
16, 16a to 16d Lock through hole
17, 17a Engaging concave portion
18 Lock unit
19 Guide portion
20 Actuator
21 Lock pin
22 Key-lock collar
23 Convex portion
24 Protrusion in the circumferential direction
25 Protrusion in the axial direction
26, 26a Column-side flange portion
27, 27a Through hole
28 Screw hole
29 Reinforcement rib

What is claimed is:
1. A steering lock apparatus comprising:
a steering column;
a key-lock collar supported by part of a steering shaft that is rotatably supported on an inside of the steering column, the key-lock collar having an engaging concave portion provided in at least one location in a circumferential direction of the steering column;
a lock through hole formed in a portion of the steering column, a phase of the portion in an axial direction of the steering column being aligned with the key-lock collar; and
a lock unit supported by the steering column, the lock unit having a guide portion located inside the lock through hole of the steering column with side surfaces of the guide portion oriented in the axial direction of the steering column, and a lock pin that, with an ignition key turned off, substantially prevents rotation of the steering shaft on the inside of the steering column by displacing inward in a radial direction of the steering column causing a tip-end portion of the lock pin to engage with the engaging concave portion of the key-lock collar;
wherein the lock through hole has a peripheral edge and the peripheral edge has sides in the circumferential direction, peripheral edge portions located on the sides, and protrusions that are provided at a plurality of locations of the sides, protrude in the circumferential direction, and are separated in the axial direction, such that, even when a force applied in an attempt to rotate the steering wheel is applied in a torsion direction of the steering column, the protrusions plastically deform according to a size of the force and the force is shared and supported by the protrusions to prevent stress concentration in part of the peripheral edge portions from occurring.

2. The steering lock apparatus according to claim 1, wherein
the protrusions have tip-end edges having a straight shape that are parallel in the axial direction of the steering column.

3. The steering lock apparatus according to claim 2, wherein
all of the tip-end edges of the protrusions on the peripheral edge portion on a same one of the sides are located on a same virtual straight line.

4. The steering lock apparatus according to claim 2, wherein
edges on both ends in the axial direction of the tip-end edges and the peripheral edge portions are continuous by way of arc portions.

5. The steering lock apparatus according to claim 1, wherein
the steering column has a pair of column-side flanges that are formed in portions of the steering column, a phase of the portions in the axial direction of the steering column being aligned with the lock through hole, the column-side flanges having through holes and protruding outward from both sides in the width direction of the steering column, wherein
the lock unit is supported by the steering column by bolts that are inserted through the through holes of the column-side flanges, and wherein
when a size of gaps in a rotational direction of the steering wheel between inner circumferential edges of the through holes and outer circumferential surfaces of the bolts is taken to be $\delta$, a size of gaps between the tip-end edges of the protrusions and the side surfaces in the width direction of the guide portion is taken to be d, and a height of each of the protrusions is taken to be h, a relationship $d < \delta \leq d + h$ is satisfied.

6. The steering lock apparatus according to claim 1, wherein
the protrusions are provided at a plurality of locations of each of the peripheral edge portions on the sides.

7. The steering lock apparatus according to claim 1, wherein
the protrusions protrude in the circumferential direction so as to be capable of contacting the guide portion, and the protrusions plastically deform according to the size of the force applied to the steering column by the guide portion.

* * * * *